United States Patent
Schafiyha et al.

(10) Patent No.: US 9,020,699 B2
(45) Date of Patent: Apr. 28, 2015

(54) METHOD AND BRAKING SYSTEM FOR INFLUENCING DRIVING DYNAMICS BY MEANS OF BRAKING AND DRIVING OPERATIONS

(75) Inventors: Scharad Schafiyha, Kriftel (DE); Ralf Loheider, Sulzbach (DE); Florian Fuhr, Stuttgart (DE)

(73) Assignees: Continental Teves AG & Co. oHG (DE); Dr. Ing. H.F.C. Porsche AG (DE)

( * ) Notice: Subject to any disclaimer, the term of this patent is extended or adjusted under 35 U.S.C. 154(b) by 335 days.

(21) Appl. No.: 13/515,548

(22) PCT Filed: Dec. 15, 2010

(86) PCT No.: PCT/EP2010/069765
§ 371 (c)(1),
(2), (4) Date: Sep. 24, 2012

(87) PCT Pub. No.: WO2011/083004
PCT Pub. Date: Jul. 14, 2011

(65) Prior Publication Data
US 2013/0013151 A1  Jan. 10, 2013

(30) Foreign Application Priority Data
Dec. 15, 2009  (DE) .......... 10 2009 054 666

(51) Int. Cl.
*A01B 69/00* (2006.01)
*B60T 8/1755* (2006.01)

(52) U.S. Cl.
CPC ....... *B60T 8/17555* (2013.01); *B60T 2270/303* (2013.01)

(58) Field of Classification Search
CPC ............. B60T 8/17; B60T 7/12; B60W 30/45
USPC ...................................................... 701/41, 70
See application file for complete search history.

(56) References Cited

U.S. PATENT DOCUMENTS

| | | | | |
|---|---|---|---|---|
| 6,076,033 | A * | 6/2000 | Hamada et al. ................. | 701/70 |
| 6,789,006 | B2 * | 9/2004 | Glock et al. ................. | 701/33.7 |
| 7,418,329 | B2 | 8/2008 | Yasui | |
| 7,580,785 | B2 * | 8/2009 | Matsumoto et al. ........... | 701/70 |
| 7,974,761 | B2 * | 7/2011 | Maeda et al. .................. | 701/70 |
| 8,600,657 | B2 * | 12/2013 | Saito et al. .................... | 701/301 |
| 8,655,563 | B2 * | 2/2014 | Maeda et al. .................. | 701/70 |

(Continued)

FOREIGN PATENT DOCUMENTS

| | | |
|---|---|---|
| CN | 101088828 | 12/2007 |
| DE | 19637193 A1 | 3/1997 |

(Continued)

OTHER PUBLICATIONS

International Application Serial No. PCT/EP2010/069765, International Search Report mailed Apr. 1, 2011, 2 pgs.

(Continued)

*Primary Examiner* — Tuan C. To
*Assistant Examiner* — Shardul Patel
(74) *Attorney, Agent, or Firm* — RatnerPrestia (57) ABSTRACT

A method and a braking system are provided, in which the driving dynamics of a motor vehicle are influenced, a driver-independent braking action generating a yawing moment which assists a steering in or steering round of the motor vehicle, and a driver-independent increase in the drive torque being caused on at least one wheel, in order at least partially to compensate the braking deceleration of the motor vehicle, a braking action being required when the ratio of the instantaneously used coefficient of friction and of the possible utilizable coefficient of friction overshoots a stipulated threshold value.

13 Claims, 4 Drawing Sheets

(56) References Cited

U.S. PATENT DOCUMENTS

2006/0217867 A1    9/2006  Ono
2010/0056338 A1*   3/2010  Erban ..................... 477/203

FOREIGN PATENT DOCUMENTS

| DE | 19963747     | A1 | 7/2001 |
|----|--------------|----|--------|
| DE | 102006013788 | A1 | 9/2006 |
| DE | 102006031511 | A1 | 1/2008 |
| DE | 102007051590 | A1 | 4/2009 |

OTHER PUBLICATIONS

Chinese Office Action mailed Jul. 1, 2014 in counterpart Chinese Application No. 201080063929.9.

* cited by examiner

METHOD AND BRAKING SYSTEM FOR INFLUENCING DRIVING DYNAMICS BY MEANS OF BRAKING AND DRIVING OPERATIONS

CROSS REFERENCE TO RELATED APPLICATIONS

This application is the U.S. National Phase Application of PCT International Application No. PCT/EP2010/069765, filed Dec. 15, 2010, which claims priority to German Patent Application No. 10 2009 054 666.9, filed Dec. 15, 2009, the contents of such applications being incorporated by reference herein.

FIELD OF THE INVENTION

The invention relates to a method in which the driving dynamics of a motor vehicle are influenced, a driver-independent braking action generating a yawing moment which assists the steering in and steering round of the motor vehicle, and a driver-independent increase in the drive torque being caused on at least one wheel, in order at least partially to compensate the braking deceleration of the motor vehicle, wherein a braking action is required when the ratio of the instantaneously used coefficient of friction and of the possible utilizable coefficient of friction overshoots a stipulated threshold value and an electronically regulated braking system which brake system has means for the driver-independent build-up of braking torque on one or more vehicle wheels, and a control apparatus which comprises the aforementioned method by an increase in the drive torque being required via a vehicle data bus in an engine control.

BACKGROUND OF THE INVENTION

Modern vehicles make frequent use of driving stability controls which avoid unstable driving situations or, when an unstable driving state in which the vehicle does not obey the driver's instructions occurs, influence the driving behavior of the vehicle in such a way that it is stabilized and can therefore be managed more effectively again by the driver. Thus, antilock control, traction control and electronic brake force distribution take effect when the longitudinal slip on at least one tire on the road assumes excessively high values. Furthermore, the driving behavior on bends can be improved by yawing movement control (GMR) which takes into account further variables, such as, for example, the yaw angle speed and the float angle speed.

DE 19963747 C2, which is incorporated by reference, discloses a method for controlling a vehicle, in which, if there is a tendency to understeering, the torque acting upon the driving wheels and coming from the engine is increased, with the result that a propulsive moment is generated on at least one bend-outside wheel, and at the same time braking actions are carried out on at least one bend-inside wheel in such a way that the increase in the torque acting upon the driving wheels and coming from the engine is exactly compensated on this wheel. This method thus avoids influencing the wheel behavior of the bend-inside driven wheel on which the braking action is carried out. Contrary to the method according to aspects of the invention, the overall disadvantage is that the vehicle is accelerated.

DE 102006031511 A1, which is incorporated by reference, discloses a method for compensating the braking deceleration in vehicle control, according to which, when a driving dynamic limit situation arises, particularly in the case of oversteering or understeering of the vehicle, a vehicle controller acts upon driving as a result of the automatic actuation of at least one wheel brake, in order to stabilize the vehicle. In addition, an additional drive torque is exerted on at least one wheel of the vehicle, so that the vehicle deceleration generated as a result of the automatic brake action is at least partially compensated. According to a preferred embodiment, the size of the drive torque applied is dependent on the deviation between the desired and the actual yawing speed of the vehicle. The method therefore takes effect only when an unstable driving situation is present.

DE 102007051590 A1, which is incorporated by reference, discloses a method for distributing the drive torques or drag torques to the driven wheels of a vehicle, the drive torque or drag torque being distributed to the driven wheels when the vehicle drives round a bend, in such a way as to give rise to a differential drive torque or drag torque which counteracts a tendency of the vehicle to understeering or oversteering. The size of the differential drive torque or drag torque is dependent on the size of the wheel contact forces acting on the wheels or on the change of these wheel contact forces. The wheel contact force is preferably measured individually for each wheel with the aid of a sensor arrangement.

Furthermore, the term "torque vectoring" refers to methods for the distribution of drive torques in all-wheel drive vehicles, said drive torques preferably activating axle differentials with an integrated clutch, the drive torque being distributed in a directed manner to the individual wheels, depending on the driving situation. Systems of this kind are cost-intensive on account of the technical outlay.

SUMMARY OF THE INVENTION

An aspect of the present invention is, therefore, to provide a driving dynamics control system which improves the agility and steering behavior of a vehicle and which avoids the abovementioned disadvantages.

This is achieved by means of the method in which the driving dynamics of a motor vehicle are influenced, a driver-independent braking action generating a yawing moment which assists the steering in and steering round of the motor vehicle, and a driver-independent increase in the drive torque being caused on at least one wheel, in order at least partially to compensate the braking deceleration of the motor vehicle, wherein a braking action is required when the ratio of the instantaneously used coefficient of friction and of the possible utilizable coefficient of friction overshoots a stipulated threshold value.

The method according to aspects of the invention, in which the driving dynamics of a motor vehicle are influenced, a driver-independent braking action generating a yawing moment which assists the steering in and steering round of the motor vehicle, and a driver-independent increase in the drive torque being caused on at least one wheel, in order at least partially to compensate the braking deceleration of the motor vehicle, is based on the notion that a braking action is required when the ratio of the instantaneously used coefficient of friction and of the possible utilizable coefficient of friction overshoots a stipulated threshold value.

The instantaneously used coefficient of friction $\mu_{used}$ can in this case be estimated by means of longitudinal and transverse acceleration $\alpha_x$ and $\alpha_y$ (g here designates gravitational acceleration):

$$\mu_{used} = \sqrt{\left(\frac{a_x}{g}\right)^2 + \left(\frac{a_y}{g}\right)^2}$$

The possible utilizable coefficient of friction (coefficient of static friction) is dependent on the tires and road surface and is preferably determined, according to the steady-state Ackermann model, by taking into account a steering angle deviation with respect to the expected linear behavior. In the case of specific transverse acceleration, the expected steering angle is expediently ascertained from the vehicle geometry, on the assumption of a steady-state drive round a bend. A deviation from the expected behavior often occurs when the instantaneously used coefficient of friction amounts to 80%-90% of the possible utilizable coefficient of friction.

Existing transverse force reserves are expediently utilized in order to improve the steering behavior, a yawing moment being generated on at least one wheel by means of a controlled and/or regulated braking action. The braking torque built up independently of the driver counteracts, for example, an understeering of the vehicle when he drives round a bend.

The advantage of this is that, in this case, a driving behavior is organized which is harmonious to the driver and can be reproduced and which obeys the driver's steering instructions with a time delay which is lower, as compared with vehicles according to the prior art.

The braking action is expediently required on the preferably driven bend-inside wheel or wheels.

A braking control action is preferably required when the transverse acceleration of the vehicle overshoots a stipulated first threshold value. If the road is dry and the tires are suitable, there is a high utilizable coefficient of friction, the coefficient of static friction typically being approximately 1. A steering angle deviation from the expected linear behavior will then occur at high transverse accelerations. Thus, by an appropriate choice of the threshold value, intensive steering maneuvers in the case of a high coefficient of friction can be assisted, without an undesirable tendency to oversteering being caused by the driving dynamics control on the roads having a low coefficient of static friction.

A braking control action is especially preferably required only when the steering wheel angle speed or a variable proportional to this undershoots a stipulated threshold value. In sharp zigzag driving or when the driver suddenly steers around, an undesirable tendency to oversteering due to a braking control torque which is too high for this driving situation is avoided.

Especially preferably, the braking action is required in accordance with the deviation of the instantaneous transverse acceleration from the stipulated first threshold value, no braking action being required for a transverse acceleration lying below the first threshold value. There are therefore no losses of comfort due to a braking action often taking place by means of an acoustically audible pressure build-up via a hydraulic pump, in the case of steering wheel movements which do not necessitate any driver-independent braking action on account of the low transverse forces occurring.

Most especially preferably, the amount of the required braking torque is selected proportionally to the amount of deviation between the instantaneous transverse acceleration and the first threshold value, no braking action which overshoots a stipulated maximum braking torque being required.

A braking regulation action is expediently required when the instantaneous steering angle deviates from the expected steering angle by more than a stipulated second threshold value. Understeering of the vehicle can thus be counteracted even in driving situations where a braking control action is not expedient.

It is especially expedient if the braking regulation torque is selected proportionally to the deviation between the instantaneous steering angle and expected steering angle and is added to a required braking control torque. Thus, depending on the driving situation, braking control action and/or braking regulation action can take place.

The amount of the required braking torque is preferably reduced when a tendency of the vehicle to oversteering is detected. Risk to driving stability is consequently avoided.

Especially preferably, a tendency of the vehicle to oversteering is detected from the fact that the time change in the deviation between the instantaneous steering angle and expected steering angle is negative, while its amount overshoots a stipulated threshold value and/or the steering wheel angle speed undershoots a stipulated threshold value, whereas the yaw acceleration overshoots a stipulated threshold value.

The amount of the required braking torque is preferably reduced when the traction slip of at least one bend-outside wheel overshoots a stipulated threshold value. A loss of ground adhesion on account of excessive slip caused by the driving dynamics control is thus prevented.

It is advantageous if the amount of the required braking torque is reduced as soon as a load change is detected. If the driver abruptly reduces the required drive torque, while after a short time a drag torque acts on the wheels instead of the previously required drive torque, an additional braking action could otherwise put driving stability at risk.

The amount of the required braking torque is preferably reduced when the amount of transverse acceleration undershoots a stipulated fraction of the maximum transverse acceleration which has occurred during the braking action. This enables the driver to drive out of a bend correspondingly according to his wishes.

Expediently, the increase in the drive torque, which increase compensates a braking deceleration occurring, takes place only when the driver himself requires a drive torque.

The invention relates, furthermore, to an electronically controlled brake system for a motor vehicle, which brake system has means for the driver-independent build-up of braking torque on one or more vehicle wheels, and a control apparatus which carries out a method as claimed in one of the preceding claims. Preferably, an increase in the drive torque is required via a vehicle data bus in an engine control.

The invention relates, furthermore, to the use of such a brake system in a motor vehicle which has an internal combustion engine and/or one or more electric vehicle drives.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
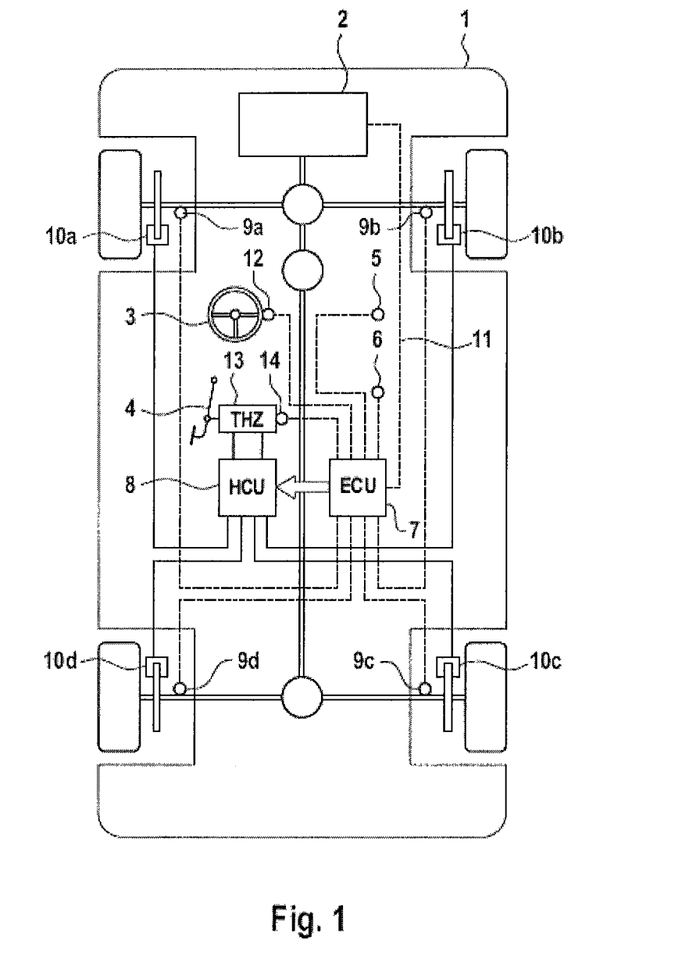
FIG. 1 shows a diagrammatic illustration of a motor vehicle.

FIG. 1 shows a diagrammatic illustration of a motor vehicle 1 which is suitable for carrying out the method according to aspects of the invention. It has an engine 2 which drives at least some of the wheels of the vehicle, a steering wheel 3, a brake pedal 4 which is connected to a tandem master cylinder (THZ) 13, and four individually actuatable wheel brakes 10a-10d. The method according to aspects of the invention can be carried out even when only some of the vehicle wheels are driven and/or conventional differentials are employed. In addition to hydraulic friction brakes, electromechanically actuated friction brakes may also be employed as wheel brakes on one or more or all wheels. According to an alternative embodiment of the invention, the vehicle has an electric drive, and the braking torque is generated on at least one wheel at least partially by the electric machine or electric machines operated as a generator.

To detect driving dynamic states, a steering wheel angle sensor (SWA) 12, four wheel rotational speed sensors 9a-9d, a transverse acceleration sensor (LA) 5, a yaw rate sensor (YR) 6 and at least one pressure sensor (P) 14 for the brake pressure generated by the brake pedal are present. In this case, the pressure sensor 14 may also be replaced by a pedal travel or pedal force sensor if the auxiliary pressure source is arranged in such a way that a brake pressure built up by the driver cannot be distinguished from the auxiliary pressure source or an electromechanical brake actuator with a known relation between the pedal position and braking torque is used.

The electronic control unit (ECU) 7 receives the data from the various sensors and controls the hydraulic unit (HCU) 8. In addition, the drive torque currently generated by the engine 2 and the torque desired by the driver are determined. These may also be indirectly ascertained variables which are derived, for example, from an engine characteristic map and are transmitted to the electronic control unit 7 via an interface 11 (CAN) by the engine control apparatus, not shown.

The driving behavior of the motor vehicle 1 is influenced substantially by the chassis design, inter alia the wheel load distribution, the elasticity of the wheel suspensions and the tire properties determined in the characteristic steering behavior. In specific driving situations which are characterized by a stipulated desired bend radius and the coefficient of friction between the tire and the road, a loss of driving stability may occur, while the steering behavior desired by the driver cannot be achieved with the given chassis design. By means of the sensors present, the driver's wish can be detected and implementation by the vehicle can be checked. Even the tendency to a loss of stability is preferably detected.

If steady-state circular driving is considered in the linear single-track model, the steer input $\delta_{stat}$ is related according to $$\delta_{stat} = \frac{l * \dot\psi}{v} + EG * a_y = \frac{l}{R} + EG * a_y \quad (1)$$

with the center distance I, the quotient of the yaw rate $\dot\psi$ and a speed v of the vehicle or the road radius R, the characteristic steering gradient EG describing the chassis design and $\alpha_y$ designating the transverse acceleration.

In this model, the characteristic steering gradient $EG_{stat}$ of the vehicle can be calculated from the geometry:

$$EG_{stat} = \frac{m}{l} * \left[ \frac{l_R}{C_F} - \frac{l_F}{C_R} \right] = \frac{m(l_R * C_R - l_R * C_F)}{l * C_F * C_R}$$

In this case, m designates the vehicle mass, I the center distance, $I_F$ the distance of the front axle from the center of gravity, $I_R$ the distance of the rear axle from the center of gravity, $C_F$ the skew running rigidity of the front axle and $C_R$ the skew running rigidity of the rear axle.

Figure 2:
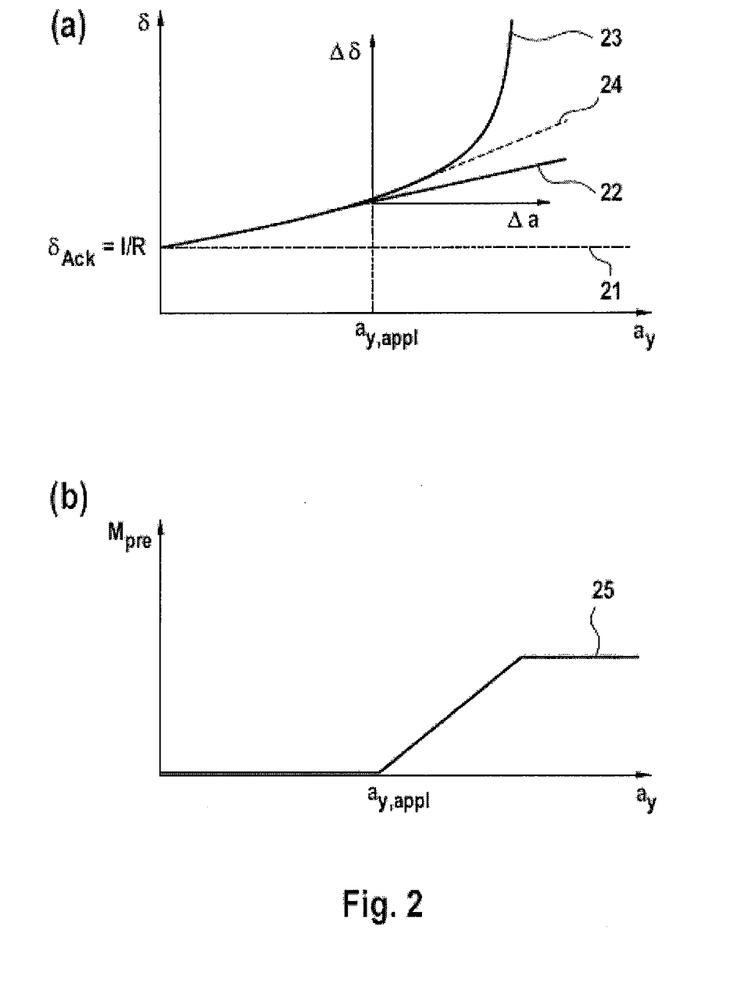
FIG. 2 shows a graph of the relation between transverse acceleration and steering angle or braking control torque.

FIG. 2 (a) shows the relation between the steering angle $\delta$ and transverse acceleration $\alpha_y$ of a vehicle designed for understeering. Line 21 marks the Ackermann angle I/R which has to be set initially in the case of very low transverse accelerations or without the wheel load displacement being taken into account. Line 22 indicates the dependence, to be expected according to formula (1), of the steering angle to be set on the transverse acceleration.

The behavior, shown in line 23, of a real vehicle deviates to another greater extent from the ideal behavior of line 22 in the case of higher transverse accelerations, since the transmittable transverse forces are limited because of the nature of the road and tire and the wheel contact forces, as is preferably described by the road coefficient of friction. The method according to aspects of the invention is also preferably aimed at ascertaining, in a given driving situation, the maximum road coefficient of friction at which the driving situation can be negotiated at the stability limit.

Line 24 shows linearization of the relation between the steering wheel angle and transverse acceleration at an operating point. The point preferably selected as the operating point is that at which the steering behavior commences to deviate from the vehicle behavior expected according to the steady-state single-track model, since this departure from the linear region indicates that the stability limit is reached or that the longitudinally or transversely dynamic adhesion reserves are exhausted and it becomes possible to deduce the road coefficient of friction.

While, according to the steady-state single-track model, the steering angle and transverse acceleration are related according to $$\Delta\delta_{stat}=EG_{stat}*\Delta\alpha_y,$$

the vehicle shows a greater increase in the steering angle according to $$\Delta\delta_{linear}=(EG_{stat}+K)*\Delta\delta_y=\Delta\delta_{stat}+\delta_{prog},$$

that is to say a progressive steering angle $\Delta\delta_{prog}$ occurs (the constant K indicates the dimension for the progressivity of the steering angle in the respective vehicle):

$$\Delta\delta_{prog}=K*\Delta\alpha_y.$$

According to aspects of the invention, a braking control torque is applied to one or more wheels and is required to be preferably proportional to the progressive steering angle $\Delta\delta_{prog}$ or to the increase in transverse acceleration.

In FIG. 2 (b), line 25 shows the dependence of the required braking control torque $M_{pre}$ on the transverse acceleration $\alpha_y$. Preferably, no braking torque is required below a threshold value $\alpha_{y,appl}$. Especially preferably, the braking control torque is selected proportionally to the amount $\Delta\alpha$ by which the instantaneous transverse acceleration overshoots the threshold value, a limitation to a maximum braking control torque taking place.

In the method according to aspects of the invention, a braking torque is applied to one wheel or to a plurality of wheels and causes yawing of the vehicle about the vertical axis in order to achieve active steering in of the vehicle. In addition, a rise in the engine torque, as compared with the original driver's wish, takes place, in order to avoid any variation in the longitudinal acceleration of the vehicle.

Figure 3:
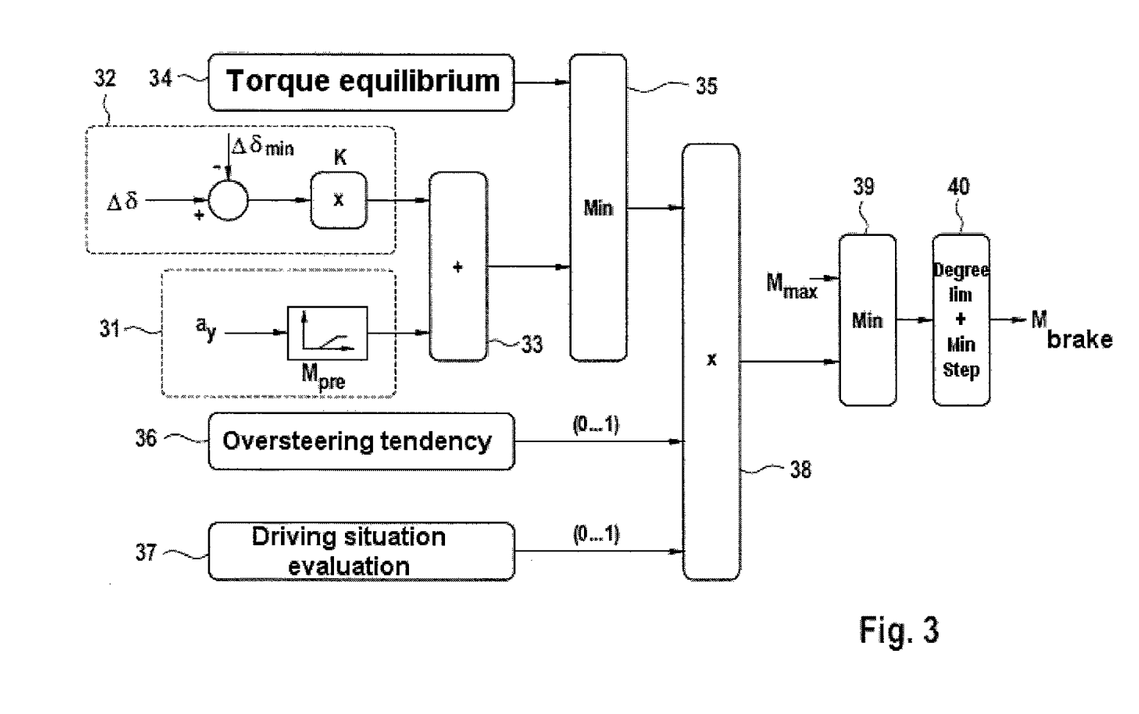
FIG. 3 shows a diagram for determining the braking torque to be required.

FIG. 3 shows a diagram for determining the braking torque to be required, a more complex strategy for calculating the braking torque being employed in this exemplary embodiment.

In block 31, the above-described determination of a braking control torque takes place. In addition, in block 32, on the basis of equation (1), regulation of the deviation $\Delta\delta$ between the currently measured steering wheel angle $\delta_{meas}$ and the steady-state steer input $\delta_{stat}$ of the vehicle model is carried out:

$$\Delta\delta = |\delta_{meas}| - |\delta_{stat}|$$

The braking regulation torque is preferably determined according to a proportional controller formulation, a requirement occurring only when the steering angle deviation $\Delta\delta$ overshoots a stipulated threshold value $\Delta\delta_{min}$. The higher the selected proportionality constant K and the lower the selected threshold value, the more the maximum road coefficient of friction and the stability reserve are utilized. The braking control torque and the braking regulation torque are added in block 33.

Block 34 contains a calculation of the maximum possible braking torque to be applied, the weight displacement being taken into account via $M_{nominal}$ and the drive torque $M_{drive}$ required by the driver.

$$M_{nominal} = \frac{m * r_{dyn}}{2} * \left( g * \frac{l_{F/R}}{l} \pm |a_y| * \frac{l_{CG}}{l_{TW}} \pm a_x * \frac{l_{CG}}{l_{TW}} \right)$$

In block 35, therefore, the braking requirement is limited to the maximum expedient braking torque in light of the torque equilibrium:

$$M_{brake} < M_{drive} + M_{nominal} * \mu_{used}$$

Since control is based on the assumption of largely steady driving states, a dynamic change in driving state (such as, for example, zigzag driving) entails the risk that the braking actions cause oversteering of the vehicle. The required braking torque is therefore reduced when a tendency to oversteering is detected in block 36. For this detection, for example, the yaw acceleration or the increase in the yaw rate, at the same time with countersteering by the driver, is considered. When oversteering occurs, the braking action is prevented completely.

Block 37 contains an evaluation of the driving situation, for example steering up when driving out of a bend, too high a slip of a bend-outside tire caused by a reduction in the coefficient of friction between tire and road, or the occurrence of a load change leading to a reduction or termination in a braking torque requirement. This is ensured in block 38, according to which the braking torque requirement is multiplied in each case by a factor, lying between zero and one, for evaluating the oversteering tendency or driving situation.

Furthermore, limitation of the required braking torque to a stipulated maximum value $M_{max}$ takes place in block 39.

In order to prevent loss of comfort due to braking torque requirements which change too often, in block 40 a braking torque requirement is implemented only when the required braking torque has a minimum size and the time change in the braking requirement undershoots a stipulated threshold value.

The calculated braking torque $M_{brake}$ is applied to the bend-inside preferably driven wheel or wheels, a requirement for drive torque occurring in addition to the driver-independent braking torque build-up or braking action. This rise in the engine torque, as compared with the original driver's wish, compensates the braking torque in order to avoid a variation in the longitudinal acceleration of the vehicle.

Figure 4:
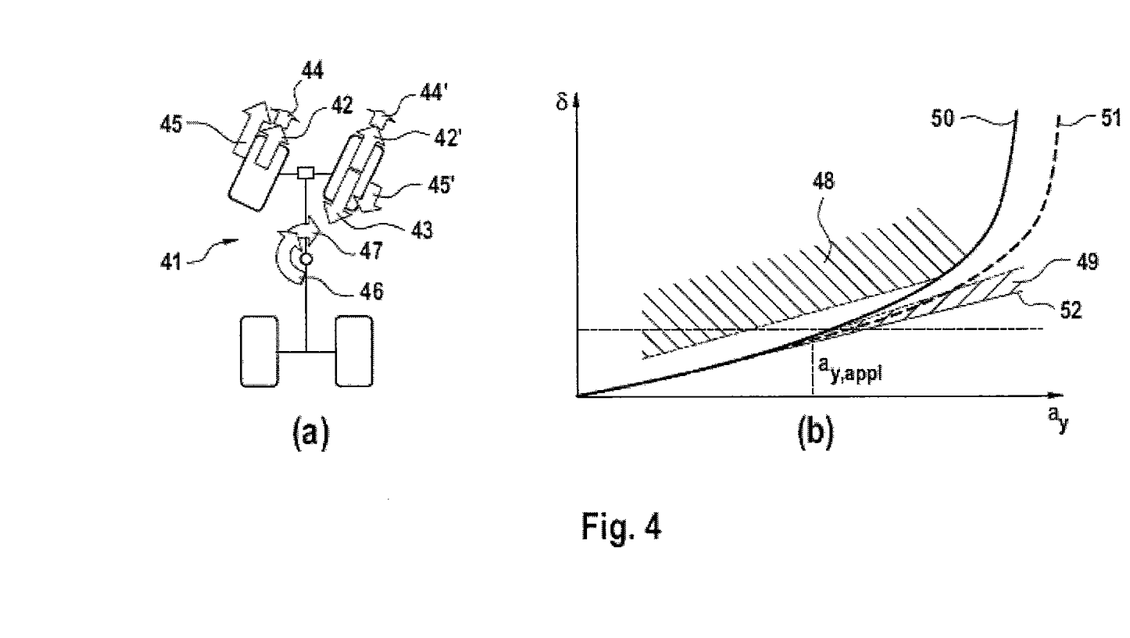
FIG. 4 shows a diagrammatic illustration of a vehicle, the driving dynamics of which are influenced by the method according to the invention.

FIG. 4a shows a motor vehicle 41 with two driven and steered front wheels, the driving dynamics of which motor vehicle are influenced by the method according to aspects of the invention. A drive torque 42, 42' corresponding to the driver's wish acts upon said two driving wheels. In addition, independently of the driver, a braking torque 43 is built up on the bend-inside driving wheel and an additional drive torque 44, 44' is required which compensates the braking deceleration of the driving dynamics control:

$$M_{drive} = 2 * (M_{brake}/2)$$

In order to avoid undesirable acceleration of the vehicle, the additional drive torque is preferably limited by the minimum of the required braking torque and of the actually built-up braking torque. A driver-independent increase in the drive torque expediently takes place only when the driver himself requires a drive torque and no driving stability control or slip control necessitates a limitation of the drive torque.

The (vector) sum of drive torques and braking torques prevailing on the driving wheels gives the resulting torques 45, 45'. The yawing moment 46 caused by the driver's steer input is supplemented by an additional yawing moment 47, with the result that the driver's steering instruction is implemented more effectively.

In FIG. 4b, line 51 shows the relation between the steering angle $\delta$ and transverse acceleration $a_y$ of a vehicle designed to be under steering, which is influenced by the method according to aspects of the invention. As compared with the uninfluenced vehicle which obeys the relation represented as line 50, the steering behavior of the vehicle has come markedly closer to the desired ideal behavior depicted as line 52. In the method according to aspects of the invention, a braking control torque is built up in region 49, in order to achieve a more neutral driving behavior. In addition, regulation of the steering angle deviation takes place in region 48 and improves the static transverse behavior of a vehicle by the optimal utilization of the stability reserves. Especially in intensive steering maneuvers where high transverse forces occur, the driver's steering instruction is implemented more effectively, without adverse effects, by virtue of the driving dynamics control described above.

The invention claimed is:

1. A method, in which driving dynamics of a motor vehicle are influenced, the method including:
   automatically braking at least one wheel of the motor vehicle to produce a yawing moment which assists a steering of the motor vehicle, and
   applying a drive torque to at least one wheel of the motor vehicle, in order at least partially to compensate for deceleration of the motor vehicle due to the braking of the at least one wheel,
   wherein a braking action is required when a ratio of an instantaneously used coefficient of friction and of a possible utilizable coefficient of friction overshoots a stipulated threshold value,
   wherein the braking action is required when a transverse acceleration of the vehicle overshoots a stipulated first threshold value, and
   wherein the braking action is required when a steering wheel angle speed or a variable proportional to this undershoots a stipulated threshold value.

2. The method as claimed in claim 1, wherein the braking action is required on the preferably driven bend-inside wheel or wheels.

3. The method as claimed in claim 1, wherein the braking action is required in accordance with a deviation of the instantaneous transverse acceleration from the stipulated first threshold value, no braking action being required for the transverse acceleration lying below the first threshold value.

4. The method as claimed in claim 3, wherein the amount of the required braking torque is proportional to the amount of deviation between the instantaneous transverse acceleration and the first threshold value, no braking action which overshoots a stipulated maximum braking torque being required.

5. The method as claimed in claim 1, wherein a braking regulation action is required when an instantaneous steering angle deviates from an expected steering angle by more than a stipulated second threshold value.

6. The method as claimed in claim 5, wherein the braking regulation torque is selected proportionally to the deviation between the instantaneous steering angle and expected steering angle and is added to a required braking control torque.

7. The method as claimed in claim 1, wherein the amount of required braking torque is reduced when a tendency of the vehicle to oversteering is detected.

8. The method as claimed in claim 7, wherein a tendency of the vehicle to oversteering is detected from the fact that the time change in the deviation between the instantaneous steering angle and expected steering angle is negative, while its amount overshoots a stipulated threshold value and/or the steering wheel angle speed undershoots a stipulated threshold value, whereas the yaw acceleration overshoots a stipulated threshold value.

9. The method as claimed in claim 1, wherein the amount of required braking torque is reduced when a traction slip of at least one bend-outside wheel overshoots a stipulated threshold value.

10. The method as claimed in claim 1 the amount of the required braking torque is reduced when a load change is detected.

11. The method as claimed in claim 1, wherein the amount of the required braking torque is reduced when the amount of transverse acceleration undershoots a stipulated fraction of the maximum transverse acceleration which has occurred during the braking action.

12. The method as claimed in claim 1, wherein the increase in the drive torque, which increase compensates a braking deceleration occurring, takes place only when the driver himself requires a drive torque.

13. An electronically controlled brake system for a motor vehicle, which brake system has means for the driver-independent build-up of braking torque on one or more vehicle wheels, and a control apparatus which carries out the method of claim 1, wherein an increase in the drive torque being required via a vehicle data bus in an engine control.

* * * * *